W. B. BALLOU.
ELASTIC BRACELET LINK.
APPLICATION FILED JAN. 10, 1913.
1,098,078.
Patented May 26, 1914.
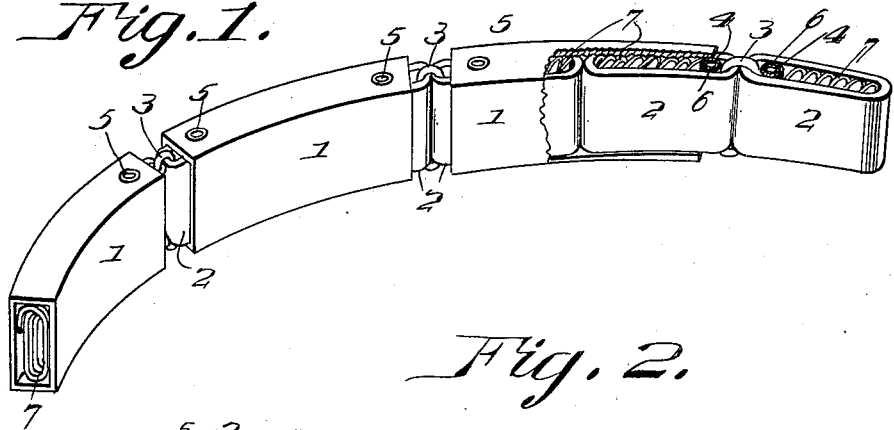
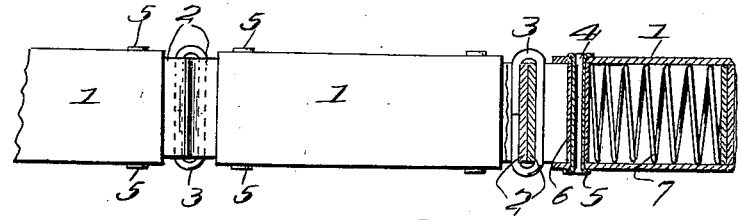
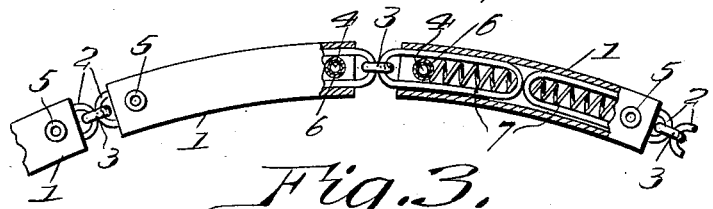
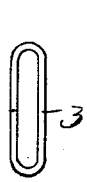
Fig. 4.
Fig. 5.
WITNESSES
Ada C. Hagerty
S. W. Sisson
INVENTOR
Walter B. Ballou
J Joseph A. Miller
Attorney
COLUMBIA PLANOGRAPH CO., WASHINGTON, D. C.

UNITED STATES PATENT OFFICE.

WALTER B. BALLOU, OF NORTH ATTLEBORO, MASSACHUSETTS, ASSIGNOR TO R. BLACKINTON & CO., OF NORTH ATTLEBORO, MASSACHUSETTS.

ELASTIC BRACELET-LINK.

1,098,078.     Specification of Letters Patent.      Patented May 26, 1914.

Application filed January 10, 1913. Serial No. 741,210.

*To all whom it may concern:*

Be it known that I, WALTER B. BALLOU, a citizen of the United States, residing at North Attleboro, in the county of Bristol and State of Massachusetts, have invented a new and useful Improvement in Elastic Bracelet-Links, of which the following is a specification.

This invention relates to certain new and useful improvements in bracelets and the object of the invention is to provide a bracelet possessed of maximum flexibility, and to further provide a bracelet structure in which the parts may be easily and quickly assembled without the use of solder.

Further, the invention aims to provide a bracelet in which the parts are constructed and assembled in a manner to eliminate any possibility of injuring the parts during the expansive movements of the same.

In the drawings—Figure 1 is a fragmentary perspective view, parts being broken away and shown in section. Fig. 2 is a fragmentary top elevation, partly in section. Fig. 3 is a side plan view, parts being broken away and shown in section. Fig. 4 is a plan view of the coupling member, and Fig. 5 is a detail perspective view of one of the sliding links.

The bracelet consists of a series of units 1 which are of hollow box-like formation. Each unit slidingly receives on its interior a pair of links 2, the inner ends of the links normally contacting, and the outer end extending beyond the ends of the unit and being secured to the outer ends of the adjacent links of the adjacent units by means of a coupling 3, which latter consists of a substantially rectangular piece of wire the sides of which pass through the adjacent sides of the adjacent links so as to permit the links to have free pivotal movement, thus permitting of great flexibility. The hollow rivets 4 are passed through the ends of the unit 1 and the tubes or rollers 6, thus securing the units in position. The tubes 6 are rotatable on the rivets and are received on the interiors of the links 2, whereby it will be seen that the sliding movements of the links 2 are attended with a minimum of friction. Coiled springs 7 are arranged on the interior of the links 2 and abut the rollers or tubes 6, and serve to hold the links in contracted position.

In assembling the parts a pair of links 2 are connected by a coupling 3, after which the rollers 6 are inserted in the links and the coiled springs placed in the links to hold the rollers in engagement with the couplings, 3, whereupon the links are placed in the units 1 and the rivets 4 which have one end headed at 5 are passed through the units and rollers, after which the rivets are headed at their other ends.

Having thus described my invention, I claim as new and desire to secure by Letters Patent;—

In combination with a hollow unit, a hollow rivet at each end of said unit, each rivet extending transversely of the unit and having its ends extending through the adjacent walls of the unit and headed into engagement with said walls, a roller on each rivet having its ends disposed adjacent said walls of the unit, a pair of links slidingly disposed in the unit and receiving the respective rollers on their interiors, and a spring in each link having the outer end thereof engaged with the roller in said link and its inner end engaged with the inner end of the link, said springs normally effecting engagement between the inner ends of the links, the unit holding the links against lateral movement relative thereto.

In testimony whereof I have signed my name to this specification in the presence of two subscribing witnesses.

WALTER B. BALLOU.

Witnesses:
    ADA E. HAGERTY,
    J. A. MILLER.

Copies of this patent may be obtained for five cents each, by addressing the "Commissioner of Patents, Washington, D. C."